(12) United States Patent
Shen et al.

(10) Patent No.: US 8,190,172 B2
(45) Date of Patent: May 29, 2012

(54) INDOOR/OUTDOOR DECISION APPARATUS AND INDOOR/OUTDOOR DECISION METHOD

(75) Inventors: Jiyun Shen, Yokosuka (JP); Yasuhiro Oda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 105 days.

(21) Appl. No.: 12/783,912

(22) Filed: May 20, 2010

(65) Prior Publication Data

US 2010/0317366 A1    Dec. 16, 2010

(30) Foreign Application Priority Data

Jun. 16, 2009    (JP) ................. 2009-143217

(51) Int. Cl.
*H04W 24/00* (2009.01)
(52) U.S. Cl. .................... 455/456.1
(58) Field of Classification Search ............. 455/456.1
See application file for complete search history.

(56) References Cited

U.S. PATENT DOCUMENTS

| | | | |
|---|---|---|---|
| 5,936,572 A | | 8/1999 | Loomis et al. |
| 6,131,038 A | * | 10/2000 | Sekine ........................ 455/513 |
| 7,283,813 B2 | * | 10/2007 | Hamanaga et al. ........... 455/415 |
| 7,397,357 B2 | * | 7/2008 | Krumm et al. ................ 340/501 |
| 7,644,524 B2 | * | 1/2010 | Azure et al. .................... 37/352 |
| 2007/0049286 A1 | * | 3/2007 | Kim et al. ................... 455/456.1 |
| 2007/0239813 A1 | | 10/2007 | Pinder et al. |
| 2008/0122690 A1 | * | 5/2008 | Wan et al. ................. 342/357.06 |
| 2008/0274752 A1 | * | 11/2008 | Houri .......................... 455/456.1 |
| 2009/0098857 A1 | * | 4/2009 | De Atley ..................... 455/411 |
| 2009/0115661 A1 | * | 5/2009 | Torimoto et al. ............. 342/387 |
| 2009/0227271 A1 | * | 9/2009 | Lee ............................ 455/456.6 |
| 2010/0090901 A1 | * | 4/2010 | Smith et al. .................. 342/451 |

FOREIGN PATENT DOCUMENTS

| | | |
|---|---|---|
| JP | 10-51840 | 2/1998 |
| JP | 2003-283509 | 10/2003 |
| JP | 2003-333640 | 11/2003 |
| JP | 2006-292532 | 10/2006 |

OTHER PUBLICATIONS

Office Action issued on Sep. 6, 2011 in the corresponding Japanese Patent Application No. 2009-143217 (with English Translation).
Masaharu Hata, "Empirical Formula for Propagation Loss in Land Mobile Radio Services", IEEE Transactions on Vehicular Technology, vol. VT-29, No. 3, Aug. 1980, pp. 317-325.
Extended European Search Report issued on Sep. 5, 2011 in the corresponding European Application No. 10161729.8.
European Office Action issued Feb. 29, 2012, in European Patent Application No. 10 161 729.8. (in English).

* cited by examiner

*Primary Examiner* — Kamran Afshar
*Assistant Examiner* — Yousef Rod
(74) *Attorney, Agent, or Firm* — Oblon, Spivak, McClelland, Maier & Neustadt, L.L.P.

(57) ABSTRACT

An appropriate indoor/outdoor decision is made for a mobile communication terminal in accordance with a purpose of selection of a positioning method or the like. A positioning server 10 is an indoor/outdoor decision apparatus for making an indoor/outdoor decision on whether a mobile communication terminal 20 is located indoors or outdoors, which has: a communication information acquiring unit 11 which acquires communication information about wireless communication at the mobile communication terminal 20; an environment information acquiring unit 12 which acquires environment information indicative of an environment associated with the mobile communication terminal 20; a criterion setting unit 13 which sets a criterion for the indoor/outdoor decision according to the environment information; and a deciding unit 14 which makes the indoor/outdoor decision with reference to the communication information on the basis of the set criterion.

6 Claims, 8 Drawing Sheets

Fig.2

| | | |
|---|---|---|
| Time | 0:00~8:00 | 0 |
| | 8:00~18:00 | 8 |
| | 18:00~22:00 | 5 |
| | 22:00~24:00 | 2 |
| Day of the week | holiday or Sunday | 10 |
| | Saturday | 5 |
| | weekday | 0 |
| Weather | fair | 10 |
| | cloudy | 7 |
| | rainy | 2 |
| | stormy | 0 |
| Season | spring | 5 |
| | summer | 7 |
| | autumn | 5 |
| | winter | 3 |
| Region | Metropolitan area | 10 |
| | surrounding area around Metropolitan area | 6 |
| | provincial city | 8 |
| | surrounding area around provincial city | 4 |
| | suburb | 2 |

Fig.3

| Identifier of received base station | Intensity of received signal | ... | Time zone | Region | Season | Weather | Adjustment for threshold |
|---|---|---|---|---|---|---|---|
| 0001 | -80~-99 | ... | weekday AM | Shibuya | summer | fair | +0.5 |
| 0001 | -80~-99 | ... | weekday PM | Shibuya | summer | fair | -0.1 |
| ... | ... | ... | ... | ... | ... | ... | ... |

INDOOR/OUTDOOR DECISION APPARATUS AND INDOOR/OUTDOOR DECISION METHOD

BACKGROUND OF THE INVENTION

1. Field of the Invention

The present invention relates to an indoor/outdoor decision apparatus and an indoor/outdoor decision method for making an indoor/outdoor decision on whether a mobile communication terminal is located indoors or outdoors.

2. Related Background Art

There is a conventionally-proposed technology (indoor/outdoor decision) to decide whether a terminal is located indoors or outdoors, based on reception conditions of radio waves. For example, Japanese Patent Applications Laid-open No. 2003-333640 (Patent Document 1) and Laid-open No. 2003-283509 (Patent Document 2) describe the technology of emitting signals from a terminal, detecting signals reflecting from wall surfaces, and making a decision on whether the terminal is located indoors or outdoors, based on the detected signals.

SUMMARY OF THE INVENTION

Incidentally, the information of whether a mobile communication terminal is located indoors or outdoors is important information in determining a positioning method of the mobile communication terminal. For example, when the mobile communication terminal is located indoors, it cannot receive radio waves from GPS satellites used in GPS (Global Positioning System). For this reason, the time for the positioning can be reduced while maintaining the positioning accuracy, by carrying out the GPS positioning with relatively high accuracy only if the mobile communication terminal is determined to be located outdoors and by carrying out other positioning (fallback positioning) such as base station positioning with relatively low accuracy, without execution of the GPS positioning, if the mobile communication terminal is determined to be located indoors.

When it is considered that the result of the indoor/outdoor decision of the mobile communication terminal is used in the determination of the positioning method as described above, it can be preferable to make the indoor/outdoor decision according to an environment in which the mobile communication terminal is present. For example, when the mobile communication terminal is located in an urban area, the accuracy of the base station positioning is high because there are many base stations installed for the base station positioning. In that case, the positioning accuracy will not drastically degrade even if the GPS positioning is not carried out based on a decision that an outdoor mobile communication terminal is located indoors. On the contrary, there are not so many base stations in a rural area and therefore the accuracy of the base station positioning is low. In that case, if an outdoor mobile communication terminal is decided to be located indoors, the base station positioning with low accuracy will be carried out and therefore the positioning accuracy will drastically degrade. Furthermore, it is often the case that a user's action pattern shows a tendency of whether the mobile communication terminal is located indoors or outdoors, according to an environment in which the mobile communication terminal is present, e.g., according to the weather, a region, a season, an event, and so on.

The present invention has been accomplished in view of the above circumstances and it is an object of the present invention to provide an indoor/outdoor decision apparatus and an indoor/outdoor decision method capable of making an appropriate indoor/outdoor decision of a mobile communication terminal according to a purpose of selection of a positioning method or the like.

In order to achieve the above object, an indoor/outdoor decision apparatus according to the present invention is an indoor/outdoor decision apparatus for making an indoor/outdoor decision on whether a mobile communication terminal is located indoors or outdoors, comprising: communication information acquiring unit which acquires communication information about wireless communication at the mobile communication terminal; environment information acquiring unit which acquires environment information indicative of an environment associated with the mobile communication terminal; criterion setting unit which sets a criterion for the indoor/outdoor decision, according to the environment information acquired by the environment information acquiring unit; and deciding unit which makes the indoor/outdoor decision with reference to the communication information acquired by the communication information acquiring unit, based on the criterion set by the criterion setting unit.

The indoor/outdoor decision apparatus according to the present invention is configured to make the indoor/outdoor decision with reference to the communication information and to set the criterion used in making the indoor/outdoor decision according to the environment associated with the mobile communication terminal. Therefore, the apparatus is able to make the indoor/outdoor decision according to the environment from a viewpoint such as a purpose of selection of a positioning method. Specifically, for example, if the environment is one expected to make an error small with an indoor decision being made (in an actually outdoor case), the criterion is set so as to make the indoor decision less likely to be made; if the environment is one expected to make an error small with an outdoor decision being made (in an actually indoor case), the criterion is set so as to make the outdoor decision less likely to be made. Namely, the indoor/outdoor decision apparatus according to the present invention is able to make an appropriate indoor/outdoor decision of the mobile communication terminal according to a purpose of selection of a positioning method or the like.

Specifically, the indoor/outdoor decision apparatus is preferably configured as follows: the communication information acquiring unit acquires as the communication information, a value associated with a reception intensity of a radio wave received by the mobile communication terminal from at least one radio wave transmitter, the criterion setting unit sets a threshold as the criterion, and the deciding unit compares the value associated with the reception intensity acquired by the communication information acquiring unit, with the threshold set by the criterion setting unit, to make the indoor/outdoor decision.

Furthermore, the indoor/outdoor decision apparatus is preferably configured as follows: the deciding unit uses a technique of pattern recognition to classify preliminarily-stored communication information of mobile communication terminals located indoors and communication information of mobile communication terminals located outdoors into a class of communication information of mobile communication terminals located indoors and a class of communication information of mobile communication terminals located outdoors, and decides to which class the communication information acquired by the communication information acquiring unit belongs, thereby making the indoor/outdoor decision, and the criterion setting unit sets a weight to be used in the classification, as the criterion. These configurations allow the apparatus to make a secure indoor/outdoor decision of the mobile communication terminal and permit secure implementation of the present invention.

The indoor/outdoor decision apparatus preferably further comprises positioning unit which determines a method of positioning for the mobile communication terminal in accordance with a result of the indoor/outdoor decision made by the deciding unit, and which performs positioning of the mobile communication terminal by the determined method. In this configuration, the positioning of the mobile communication terminal is carried out by an appropriate positioning method based on the indoor/outdoor decision.

The indoor/outdoor decision apparatus is preferably configured as follows: the criterion setting unit preliminarily stores results of positioning for other mobile communication terminals by the positioning unit and environment information associated with the other mobile communication terminals acquired by the environment information acquiring unit, in association with each other, and sets the criterion on the basis of those pieces of information. This configuration permits the criterion to be set so as to reflect the results of positioning of the other mobile communication terminals and thus enables the apparatus to make a more appropriate indoor/outdoor decision of the mobile communication terminal in terms of selection of a positioning method.

Incidentally, the present invention can be described as the invention of the indoor/outdoor decision apparatus as described above, and can also be described as the invention of an indoor/outdoor decision method as described below. This is different in category but substantially the same invention, with the same action and effect.

Namely, an indoor/outdoor decision method according to the present invention is an indoor/outdoor decision method for making an indoor/outdoor decision on whether a mobile communication terminal is located indoors or outdoors, comprising: a communication information acquiring step of acquiring communication information about wireless communication at the mobile communication terminal; an environment information acquiring step of acquiring environment information indicative of an environment associated with the mobile communication terminal; a criterion setting step of setting a criterion for the indoor/outdoor decision, according to the environment information acquired in the environment information acquiring step; and a deciding step of making the indoor/outdoor decision with reference to the communication information acquired in the communication information acquiring step, based on the criterion set in the criterion setting step.

The present invention allows the indoor/outdoor decision to be made according to the environment from the viewpoint such as the purpose of selection of the positioning method, and thus realizes the appropriate indoor/outdoor decision of the mobile communication terminal.

BRIEF DESCRIPTION OF THE DRAWINGS

FIG. 2 is a table to show correspondence between environment information and numerical values used for determining a threshold for an indoor/outdoor decision.

FIG. 3 is a table to show correspondence between environment information and adjustment values for the threshold used for determining the threshold for the indoor/outdoor decision.

DESCRIPTION OF THE PREFERRED EMBODIMENTS

The preferred embodiments of the indoor/outdoor decision apparatus and the indoor/outdoor decision method according to the present invention will be described below in detail with the drawings. In the description of the drawings the same elements will be denoted by the same reference symbols, without redundant description.

Figure 1:
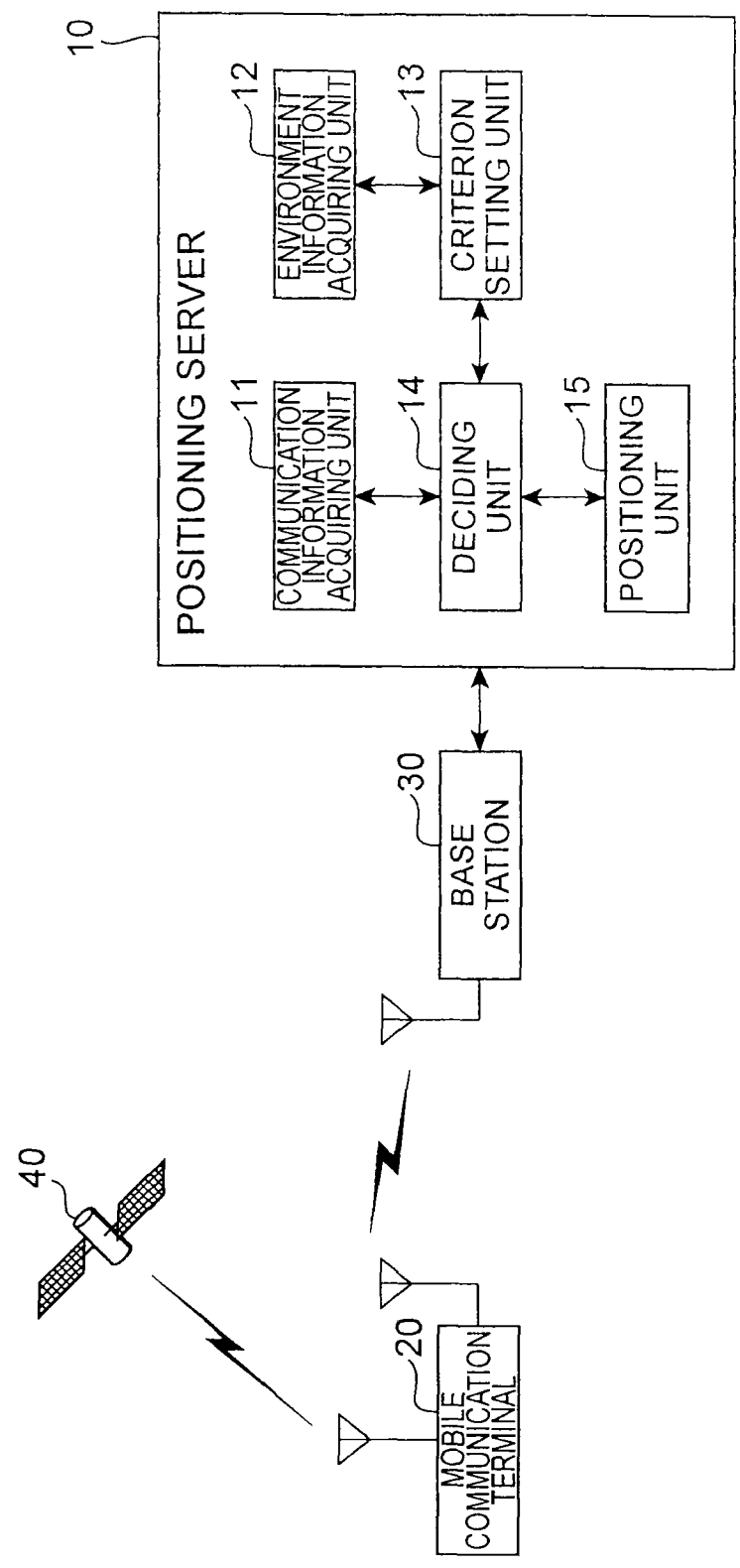
FIG. 1 is a drawing to show a functional configuration of a positioning server which is an indoor/outdoor decision apparatus according to an embodiment of the present invention.

FIG. 1 shows a positioning server 10 which is an indoor/outdoor decision apparatus according to the present embodiment. The positioning server 10 is a device that makes an indoor/outdoor decision on whether a mobile communication terminal 20 is located indoors or outdoors, e.g., inside or outside a construction such as an office building or a house. Furthermore, the positioning server 10 is a device that estimates a location of the mobile communication terminal 20. The indoor/outdoor decision by the positioning server 10 is carried out for determining a method of estimating the location of the mobile communication terminal 20 as described below.

The positioning server 10 is connected to a plurality of base stations 30 in a mobile communication system (cellular communication system) that provides the function of mobile communication to the mobile communication terminal 20, and can communicate through a base station 30 with the mobile communication terminal 20. The positioning server 10 may be included in the mobile communication system. However, the positioning server 10 does not always have to transmit and receive information to and from the mobile communication terminal 20 through the base station 30 (or a mobile communication network), but it is sufficient that the positioning server 10 be configured to transmit and receive information to and from the mobile communication terminal 20 through any means.

The mobile communication terminal 20, specifically, corresponds, for example, to a cell phone and is used by a user subscribing to a telecommunications carrier providing the mobile communication system. The mobile communication terminal 20 has a function to carry out mobile communication (cellular communication) through wireless communication with a plurality of base stations 30 included in the mobile communication network (cellular communication network) of the mobile communication system. The mobile communication terminal 20 acquires information necessary for an indoor/outdoor decision and transmits the information to the positioning server 10. The information necessary for the indoor/outdoor decision includes communication information about wireless communication performed by the mobile communication terminal 20. What specific type of information is acquired and transmitted will be described later.

Furthermore, the mobile communication terminal 20 acquires information for measurement of the location of the terminal 20 itself and transmits the information to the positioning server 10. Specifically, the information is information for base station positioning and GPS positioning. The base station positioning is to perform positioning based on information associated with radio waves transmitted and received to and from the base stations 30. The GPS positioning is to perform positioning based on information associated with radio waves transmitted from GPS satellites 40 and received by the mobile communication terminal 20. Namely, the mobile communication terminal 20 is provided with a means for receiving signals used in positioning, which are transmitted from the GPS satellites 40. The mobile communication terminal 20 is provided with an antenna for receiving the signals from the GPS satellites, and receives the signals through the use of the antenna. On the occasion of carrying out the GPS positioning, the mobile communication terminal 20 transmits information about the received signals from the GPS satellites 40 to the positioning server 10. The positioning server 10 carries out a positioning operation in both of the base station positioning and the GPS positioning. The mobile communication terminal 20 is configured with such hardware as a CPU (Central Processing Unit), memories, and a wireless communication module.

Each base station 30 is a constituent element in the mobile communication network and radio wave transmitter that transmits a radio wave for the indoor/outdoor decision, and is installed at a predetermined location. Information to uniquely identify a base station 30, e.g., a base station ID, location information of the base station, etc. is set for each base station 30 and the positioning server 10 and the mobile communication terminal 20 can identify the base station 30 on the basis of the information. There are cases where each base station 30 is sectorised and a plurality of sectors are set in respective directions of transmission of radio waves (the sectors can also be identified in the same manner as above).

The GPS satellites 40 are located at predetermined positions according to time and transmit the positioning signals for positioning from the respective positions. Specifically, there are the GPS satellites 40 at the altitude of about 20000 km, four to five satellites on each of six orbits, and they move on the orbits with lapse of time. The positioning signals transmitted from the GPS satellites 40 contain identification information to discriminate and identify the GPS satellites 40, information indicative of the orbits of the GPS satellites 40, and information indicative of times of transmission of the signals.

The below will describe the concept about the indoor/outdoor decision made by the positioning server 10 according to the present embodiment. Two types of errors can occur when the indoor/outdoor decision is made. They are an error of an indoor decision (in an actually outdoor case) and an error of an outdoor decision (in an actually indoor case). As described below, the positioning server 10 according to the present embodiment changes the positioning result according to the result of the indoor/outdoor decision. Namely, when an indoor decision is made, the fallback positioning such as the base station positioning is carried out, without execution of the GPS positioning for which it is difficult to receive the radio waves, to reduce the time for positioning.

For example, in an urban area where buildings are congested, there are many base stations 30 installed (at small intervals and a high density of base stations 30) and it is thus easy to receive radio waves from base stations 30 even indoors. On the other hand, the reception environment of GPS satellites is poor in the urban area and it is highly likely that the accuracy of GPS positioning becomes low even outdoors. In such places, the accuracy of the base station positioning is high and therefore the positioning accuracy will not drastically degrade even if the GPS positioning is omitted based on a decision that an outdoor mobile communication terminal 20 is located indoors. Therefore, the error with the indoor decision causes little influence in the urban area. On the other hand, in a rural area where buildings are scattered, there are not so many base stations 30 installed and it is hard to receive radio waves from base stations 30 indoors. In such places, the accuracy of the base station positioning is low and if the GPS positioning is omitted based on the decision that an outdoor mobile communication terminal 20 is located indoors, the positioning will be carried out by the positioning method with low positioning accuracy though the positioning can be performed with sufficient positioning accuracy. Therefore, the error with the indoor decision can cause significant influence in the rural area and it is thus desirable to accurately decide that an outdoor mobile communication terminal 20 is located outdoors, from the viewpoint of positioning accuracy.

Namely, when the indoor/outdoor decision is used for selection of the positioning method, it is preferable that an outdoor decision be more likely to be made in the rural area than in the urban area. In the present embodiment, as described above, the appropriate criterion in terms of selection of the positioning method is set according to the environment of the mobile communication terminal 20.

The below will describe the detailed functions of the positioning server 10. As shown in FIG. 1, the positioning server 10 is configured with a communication information acquiring unit 11, an environment information acquiring unit 12, a criterion setting unit 13, a deciding unit 14, and a positioning unit 15.

The communication information acquiring unit 11 is a communication information acquiring unit that acquires communication information about wireless communication at the mobile communication terminal 20. The communication information is information used in the indoor/outdoor decision of the mobile communication terminal 20. For example, the communication information acquiring unit 11 acquires as the communication information, reception information about a radio wave received by the mobile communication terminal 20 from a radio wave transmitter. The reception information is, for example, information of a radio wave from a base station 30. The mobile communication terminal 20 acquires the reception intensity of the radio wave received from the base station 30, by measurement. The radio wave is, for example, a radio wave associated with a pilot signal (broadcast signal) periodically transmitted from the base station 30. Furthermore, the mobile communication terminal 20 acquires the information to identify the base station 30, e.g., the base station ID, from the signal and associates the information with the information indicative of the measured reception intensity to obtain the reception information. The reception information may contain a sector associated with the radio wave. The mobile communication terminal 20 transmits the reception information thus acquired, to the positioning server 10. The communication information acquiring unit 11 receives the reception information transmitted from the mobile communication terminal 20, thereby acquiring the reception information.

The reception information may contain information associated with radio waves received from a plurality of base stations 30. If the mobile communication terminal 20 is provided with a plurality of branches, reception intensities of radio waves from a plurality of base stations 30 can be measured by a single measurement. Furthermore, the reception information may contain information associated with radio waves received at a plurality of different times. In the case where the reception information received from the mobile communication terminal 20 contains the information of the reception intensities of the radio waves received at different times, the communication information acquiring unit 11 calculates a statistical value (e.g., a mean value or median value of the reception intensities at all the times) from the plurality of reception intensities for each base station 30 in the reception information, and defines the statistical value as the reception intensity to be used in the following processing. The communication information acquiring unit 11 outputs the acquired reception information to the deciding unit 14.

The environment information acquiring unit 12 is an environment information acquiring unit that acquires environment information indicative of an environment associated with the mobile communication terminal 20. The environment associated with the mobile communication terminal 20 is, for example, a date of execution of positioning, a day of the week, a time, a place (region), a season, the weather, a location of either an urban area or a rural area, an event at the location, and so on (e.g., information in the left column in the table of FIG. 2). These pieces of information are information that affects whether (a user carrying) the mobile communication terminal 20 is located outdoors or indoors. For example, with the weather of rain or snow, the user is present indoors with a high possibility. If it is fine and the daytime in a holiday, e.g., Saturday, and if the terminal is located in a place where an event is held outdoors, the user can be present outdoors with a high possibility. The environment information is information used in the indoor/outdoor decision and relates to an environment where the communication information is acquired.

The environment information acquiring unit 12 acquires the environment information, for example, by receiving the environment information transmitted from the mobile communication terminal 20 to the positioning server 10. For example, if the communication information is measured at the mobile communication terminal 20 and transmitted immediately to the positioning server 10, the environment information acquiring unit 12 may be configured to automatically acquire the environment information by a clocking function or the like of its own, e.g., temporal information such as a day of the week and the time associated with the timing of reception of the communication information as the environment information. The environment information acquiring unit 12 outputs the acquired environment information to the criterion setting unit 13. The environment information may also be defined as the information associated with the base station 30 in the reception information (preliminarily stored in the environment information acquiring unit 12). For example, the environment information may be defined as the preliminarily-stored location of the base station 30 (information indicative of a place or a region, or either an urban area or a rural area) associated with the information to identify the base station 30 in the reception information.

The criterion setting unit 13 is a criterion setting unit that sets a criterion for the indoor/outdoor decision by the deciding unit 14, according to the environment information acquired by the environment information acquiring unit 12. An error rate Ei in the indoor decision case and an error rate Eo in the outdoor decision case can be controlled by changing the aforementioned criterion. Ei and Eo are in a trade-off relation. For example, if the tolerance for Ei is set looser, Ei will increase while Eo will decrease. If the tolerance for Ei is set severer on the contrary, Ei will decrease while Eo will increase.

The criterion for the indoor/outdoor decision is, for example, a threshold. Namely, as described below, if a value based on the communication information (a building entry loss in the below-described example) is not less than a threshold, an indoor decision is made; if it is below the threshold, an outdoor decision is made. If a large value is used for the threshold, an indoor decision is made only if the building entry loss is large. In this case, the indoor decision is made with the building entry loss being very large, and it can be surely said that the terminal is located indoors; therefore, the error rate Ei is small. On the other hand, an outdoor decision is made in cases except for the cases where the building entry loss is very large. Namely, some of outdoor decisions may usually include indoor situations of the building entry loss, and thus the error rate Eo in the outdoor decision case becomes large. If a very small value is used for the threshold, Ei becomes large and Eo small.

As described above, the positioning time can be reduced in the urban area by carrying out the GPS positioning for the mobile communication terminal 20 that can be surely decided to be located outdoors, and by omitting the GPS positioning in the other cases, and degradation of positioning accuracy is also less. Therefore, in such cases, the overall performance of positioning becomes improved when the threshold of building entry loss is set lower than usual, to loosen the tolerance of Ei to decrease Eo.

On the other hand, the positioning time can be reduced in the rural area by carrying out the GPS positioning in cases except for the mobile communication terminal 20 that can be surely decided to be located indoors and by omitting the GPS positioning in the other cases, and the degradation of positioning accuracy is also less. Therefore, in such cases, the overall performance of positioning becomes improved when the threshold of building entry loss is set lower than usual, to loosen the tolerance of Ei to decrease Eo.

Specifically, the criterion setting unit 13 preliminarily stores information of correspondence between environment information and numerical values as shown in the table of FIG. 2 and determines the threshold on the basis of the table. The criterion setting unit 13 converts pieces of the environment information acquired by the environment information acquiring unit 12, into respective numerical values, based on the table of FIG. 2, and sums up them. As the sum becomes larger, the criterion setting unit 13 sets a larger value as the threshold of the building entry loss, with the judgment that the mobile communication terminal 20 is located outdoors and in a situation where it is easy to perform the GPS positioning. What value should be set for the threshold according to the sum is preliminarily tuned and determined. The criterion setting unit 13 outputs information of the threshold indicative of the set criterion, to the deciding unit 14.

The threshold may be determined according to a combination of plural pieces of environment information, instead of the conversion of individual pieces of environment information into respective numerical values. For example, as in the table shown in FIG. 3, the criterion setting unit 13 preliminarily stores correspondence between combinations of environment information and adjustment values for the threshold. The environment information herein is information of an identifier of a base station 30 included in the reception information, a reception intensity of a signal from the base station 30, a time zone, a region, a season, and the weather. The adjustment values for the threshold are values of change from a reference value of the threshold preliminarily set and stored in the criterion setting unit 13. The criterion setting unit 13 compares each piece of environment information acquired by the environment information acquiring unit 12, with each piece of environment information in the table shown in FIG. 3, to acquire information indicative of an adjustment value for the threshold corresponding to the environment information matching with the environment information acquired by the environment information acquiring unit 12, in the table. The criterion setting unit 13 adjusts the preliminarily-stored reference value of the threshold by the adjustment value for the threshold, thereby determining the threshold. The reference value of threshold, the adjustment values for the threshold corresponding to respective pieces of environment information, and the environment information used in determination of the threshold are preliminarily tuned and determined.

The deciding unit 14 is a deciding unit that makes an indoor/outdoor decision with reference to the communication information acquired by the communication information acquiring unit 11, based on the criterion set by the criterion setting unit 13. For example, in the case where the reception information is used as the communication information, the indoor/outdoor decision is made as described below. The deciding unit 14 calculates a building entry loss from the reception information. The building entry loss is an attenuation of a radio wave reaching the mobile communication terminal 20 due to influence of a building in situations where the building is located between the mobile communication terminal 20 and a radio wave transmitter and, particularly, in a situation where the mobile communication terminal 20 is located inside or near the building.

The deciding unit 14 determines whether the calculated building entry loss is not less than the threshold being the criterion set by the criterion setting unit 13, and decides that the mobile communication terminal 20 is located indoors if the calculated building entry loss is not less than the threshold. On the other hand, if the calculated building entry loss is less than the threshold, it decides that the mobile communication terminal 20 is located outdoors. This is based on the fact that the building entry loss over a certain level occurs if the mobile communication terminal 20 is located indoors.

The calculation of the building entry loss can be performed by any method but is carried out, for example, by the following method. The deciding unit 14 first acquires location information indicative of a location where the mobile communication terminal 20 received the radio wave associated with the reception information. The location associated with the location information acquired herein does not always have to be a highly accurate one, but it may be an approximate location with low accuracy (e.g., with an error of about several ten meters to several hundred meters). The location information acquired herein is, for example, information indicative of location coordinates such as latitude and longitude. The deciding unit 14 performs, for example, estimation (operation) of the location of the mobile communication terminal 20, based on the reception information received by the communication information acquiring unit 11, to acquire the location information. Specifically, the location of the mobile communication terminal 20 may be determined to be a coordinate location of a base station 30 with the highest reception intensity indicated by the reception information. The information indicative of the coordinate location of the base station 30 is preliminarily stored in the deciding unit 14. The location of the mobile communication terminal 20 may also be determined to be a center coordinate location of a sector of a base station 30 with the highest reception intensity indicated by the reception information. The information indicative of the center coordinate location of the sector of the base station 30 is preliminarily stored in the deciding unit 14.

Furthermore, the deciding unit 14 may be configured to estimate the location of the mobile communication terminal 20 by any method other than the above. For example, base station positioning (operation) described below may be carried out. Furthermore, the deciding unit 14 may be configured to receive and acquire the location information from the mobile communication terminal 20, instead of estimating the location of the mobile communication terminal 20. In that case, the mobile communication terminal 20 has a function to perform positioning of the terminal itself, and transmits the location information in association with the reception information to the positioning server 10. The deciding unit 14 may also be configured to receive the location information of the mobile communication terminal 20 from any device other than the mobile communication terminal 20.

Figure 4:
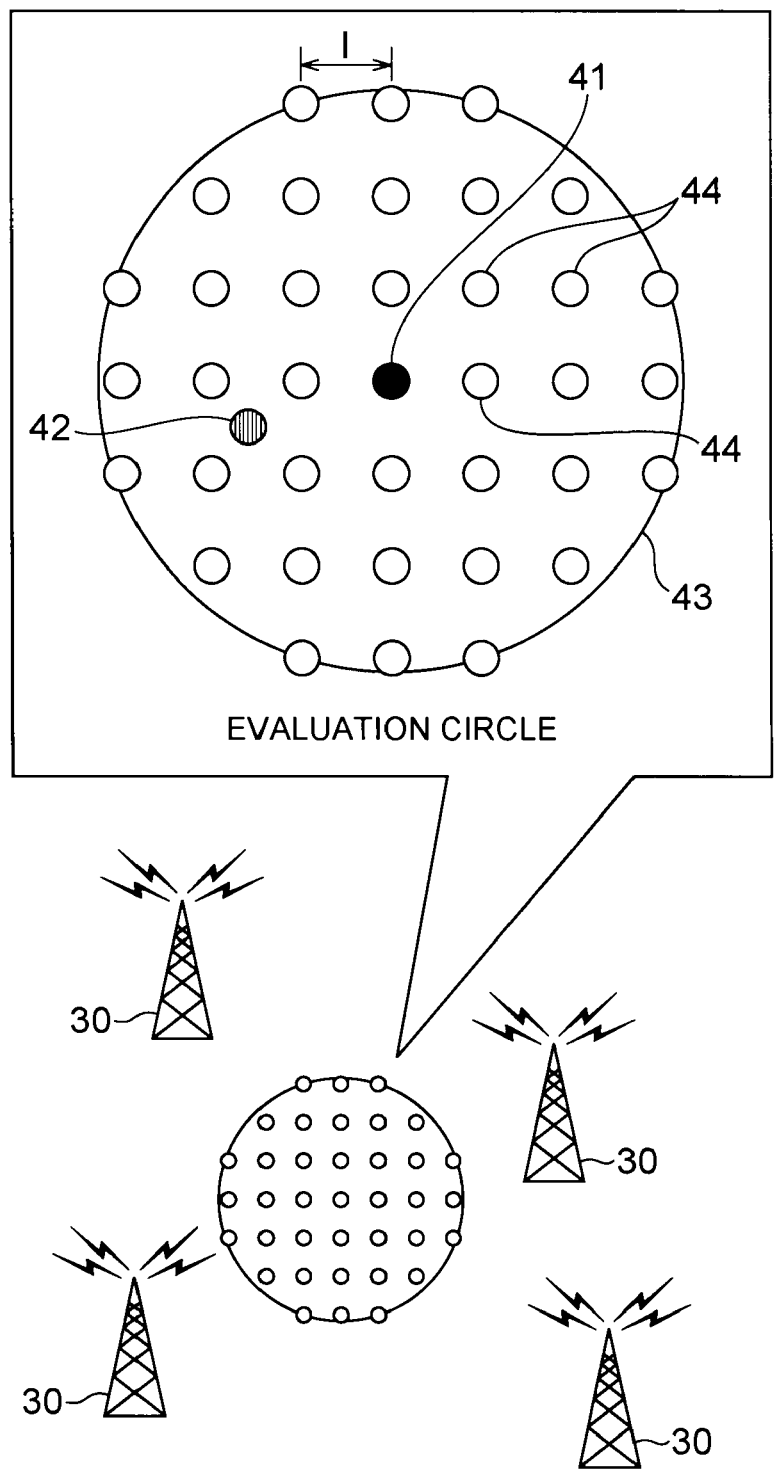
FIG. 4 is a drawing to illustrate a procedure of estimation of reception intensity.

The deciding unit 14 estimates the reception intensity of the radio wave from the base station 30 indicated by the reception information received by the communication information acquiring unit 11, according to the location indicated by the location information acquired as described above. The reception intensity of the radio wave estimated by the deciding unit 14 is a theoretical value of the reception intensity of the radio wave according to the location indicated by the location information. FIG. 4 shows the location 41 indicated by the acquired location information. However, since the location 41 indicated by the location information acquired as described above is (or can be) the approximate position as described above, it might be different from a location 42 where the mobile communication terminal 20 is actually located. When the above is taken into consideration, the reception intensity estimated by the deciding unit 14, preferably, is not (the theoretical value of) the reception intensity of the radio wave at the location indicated by the location information, but is a value representative of an area including surroundings of the location indicated by the location information. From this point of view, the deciding unit 14 estimates the reception intensity of the radio wave, specifically, as described below.

The deciding unit 14 sets a predetermined range based on the location indicated by the location information. For example, as shown in FIG. 4, the deciding unit 14 sets as the predetermined range a range 43 of a circle with a predetermined radius (evaluation circle 43) centered on the location 41 indicated by the location information. The radius of the evaluation circle 43 is determined, for example, to be a value preliminarily set with consideration to the above and stored in the deciding unit 14 (e.g., 100 m or the like). This value may be defined as one according to a communication area of the base station 30 or a method of estimating the location information. Namely, the aforementioned predetermined range may be determined according to the communication area of the base station 30 or the estimation method of the location associated with the location information.

Specifically, the value of the radius of the evaluation circle 43 may be determined to be a value of a cell radius of a base station 30 with the highest reception intensity indicated by the reception information, among the base stations 30 indicated by the reception information. The cell radius is a communication area covered by each base station 30 and is determined for each base station 30, based on the radio wave intensity of the base station 30, installation intervals of base stations 30, and so on. When the evaluation circle 43 is determined as described above, information indicative of the value of the cell radius of each base station 30 is preliminarily stored in the deciding unit 14 and the deciding unit 14 refers to the values to determine the evaluation circle 43. It is also possible to adopt as the value of the radius of the evaluation circle 43, an average value of all cell radii of base stations 30 in a region of interest or an average value of cell radii of the base stations 30 indicated by the reception information. The reason for the above is that the accuracy of the location estimated by the deciding unit 14 is considered to become worse with increase in the cell radius.

Furthermore, the value of the radius of the evaluation circle 43 may be determined to be 500 m in the case where the estimation of the location information is to estimate the terminal location as the location of the base station 30, or to be 200 m or the like in the case where the estimation of the location information is to estimate the terminal location as the center location of the sector (on the assumption that the deciding unit 14 preliminarily stores the estimation methods and values of radius of evaluation circle 43 in association with each other). Namely, the value of the radius is set smaller as the accuracy of the positioning method becomes higher. In that case, the value of the radius of the evaluation circle 43 is determined based on the information indicative of the estimation method of the location information. If the estimation of the location is carried out at the mobile communication terminal 20, the mobile communication terminal 20 transmits the information indicative of the estimation method of the location information, together with the location information, to the deciding unit 14 of the positioning server 10. The reason for the above is that the accuracy of the location estimated is considered to be that according to the estimation method of the location information.

Subsequently, the deciding unit 14 sets evaluation points 44 (coordinates) at a plurality of locations in the evaluation circle 43. The evaluation points 44, for example as shown in FIG. 4, are equally-spaced locations in prescribed directions (e.g., the south-north direction and east-west direction) based on the location 41 indicated by the location information. An interval I between evaluation points 44 can be determined, for example, to be a value (system parameter) preliminarily set and stored in the deciding unit 14, or a value calculated from the value of the radius of the evaluation circle 43. For example, it is calculated based on the equation of evaluation point interval I=radius of evaluation circle/n (where n is a value (system parameter) stored in the deciding unit 14, e.g., 10 or the like). The evaluation points 44 may include the location 41 indicated by the location information.

A more accurate method to set the evaluation points than the above method is the following method. First, the deciding unit 14 preliminarily stores reception intensities of radio waves received by the mobile communication terminal from transmitters according to locations. Specifically, an area covered by all base stations 30 is gridized in advance, and electric field intensities of radio signals from all the base stations 30 are estimated in each grid (with the mobile communication terminal 20 being in the grid). The gridization may be carried out by a method as described below. The estimation of electric field intensities needs to be carried out in consideration of elements such as distances from the base stations 30, geography and topographical features of the grid, the shape of a building, materials of the building, and so on. The estimated signal intensities of all the base stations in the respective grids thus estimated are recorded in a database that is referable by the deciding unit 14.

This database has a structure storing location coordinates of the respective grids, identifiers of all the base stations in each of the grids, estimated field intensities of signals from the respective base stations, and so on. This database is preliminarily prepared by measurement or by computer simulation or the like by an administrator or the like of the network. This database may be the same as a database used in a positioning system to estimate the location of the mobile communication terminal 20 normally by making use of database collation.

Subsequently, the deciding unit 14 makes a comparison between the reception intensity associated with the reception information acquired by the reception information acquiring unit 12, and the stored reception intensities and acquires the location information, based on the result of the comparison. Specifically, the deciding unit 14 compares the signal intensity (reception intensity) of the radio wave transmitted and received between the mobile communication terminal 20 and the base station 30, which was measured and acquired by the mobile communication terminal 20, with the estimated signal field intensities recorded in the database and selects a grid with a highest degree of coincidence with the measured signal intensity by calculation. A method to calculate the degree of coincidence may be, for example, a method of determining Euclidean distances between the data measured by the mobile communication terminal 20 and the estimated signal field intensities recorded in the database and defining a grid with a smaller Euclidean distance as a grid having a higher degree of coincidence. How to calculate an Euclidean distance is as follows: for each base station 30 measured at the mobile communication terminal 20, a difference is calculated between the measured signal intensity and the estimated signal field intensity of the same base station 30 recorded in the database, and a square root of a sum of squares of respective differences for all the base stations 30 measured at the mobile communication terminal 20 is defined as the Euclidean distance. The location information acquiring unit 13 sets as the location information, location coordinates of the grid with the highest degree of coincidence thus calculated (e.g., a center point of the grid).

Figure 8:
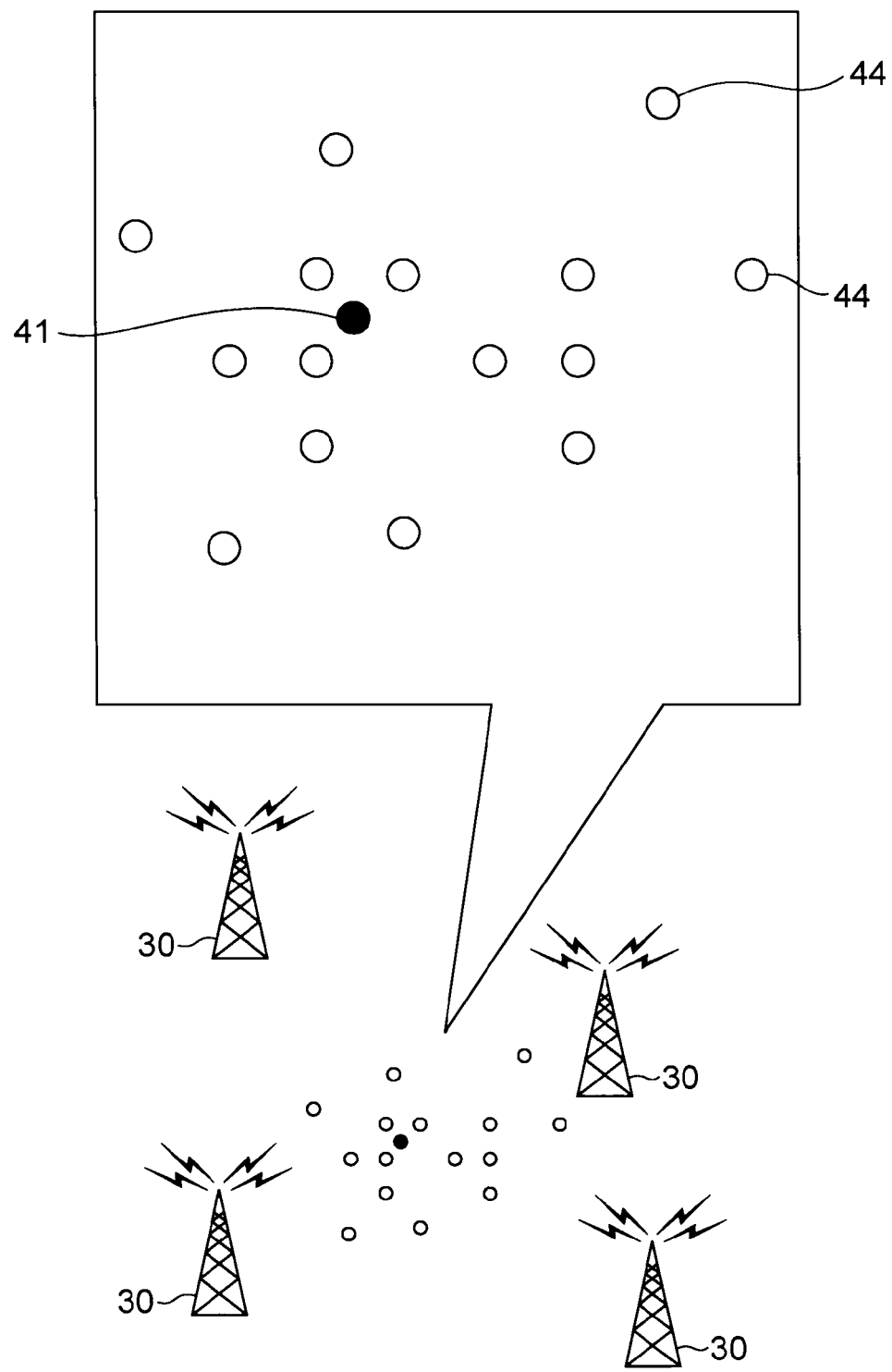
FIG. 8 is another drawing to illustrate the procedure of estimation of reception intensity.

It is, however, noted that the foregoing location information calculated in the location information acquiring unit 13 does not have to be information associated with one location. In this case, for example, degrees of coincidence are calculated for the respective grids in the database and location coordinates of n grids with highest degrees of coincidence are set as the location information. The number n may be a parameter preliminarily set by the network administrator or the like, e.g., n=10 or the like. When the foregoing locations are set as the location information, as shown in FIG. 8, those locations may be used as the aforementioned evaluation points 44. The deciding unit 14 handles the evaluation points 44 as described below, to estimate the reception intensity of the radio wave according to the location indicated by the location information.

Furthermore, as shown in FIG. 8, if the deciding unit 14 can acquire the location 41 indicated by the location information, by the method as described above (except for the method of comparison with the stored reception intensities as described above), it sets a predetermined range based on the location 41. It may be configured to calculate degrees of coincidence described above, only within the set range and to carry out the setting of evaluation points 44. In this case, the setting of the range may be carried out, for example, by the same method as the aforementioned range setting method.

Subsequently, the deciding unit 14 calculates (a theoretical value of) the reception intensity of the radio wave from the base station 30 indicated by the reception information, at each evaluation point 44. The theoretical value calculated herein is calculated on the assumption that the mobile communication terminal 20 is located outside a building (=outdoors) at that point. The deciding unit 14 calculates a distance between each base station 30 and the evaluation point 44, with reference to the information indicative of the location of each base station 30 preliminarily stored in the deciding unit 14. Next, it calculates the reception intensity from the distance and the transmission intensity of the radio wave of each base station 30 preliminarily stored in the deciding unit 14. This calculation is carried out, for example, using the Okumura-Hata, et al. radio wave propagation model (e.g., cf. "M. Hata, "Empirical formula for propagation loss in land mobile radio services," IEEE Trans. Veh. Technol., VT-29, No. 3, pp. 317-325, August 1980"). The parameters in the radio wave propagation model are those preliminarily tuned and stored in the deciding unit 14. The deciding unit 14 calculates the reception intensity, for each base station 30 indicated by the reception information and for each evaluation point 44.

The deciding unit 14 calculates a statistical value of reception intensities at the respective evaluation points 44 for each base station 30 (e.g., a mean value or median value of reception intensities at all the evaluation points 44). The deciding unit 14 may define the statistical values for the respective base stations 30 calculated in this manner, as the reception intensity of the radio wave according to the location indicated by the location information. Furthermore, the deciding unit 14 calculates a further statistical value of the statistical values of the respective base stations 30 (e.g., a mean value or median value of reception intensities for all the base stations 30). The deciding unit 14 may define one statistical value calculated in this manner, as the reception intensity of the radio wave according to the location indicated by the location information. When the reception intensity is one value as in this case, the reception intensity of the reception information acquired by the communication information acquiring unit 11 shall also be one value. In that case, the communication information acquiring unit 11 calculates a statistical value of values of reception intensities corresponding to the respective base stations 30 in the reception information (e.g., a mean value or median value of reception intensities for all the base stations 30) and defines the statistical value as a value of the reception intensity associated with the reception information.

The estimation of the reception intensity by the deciding unit 14 does not always have to be carried out by calculation for each procedure (of the estimation of influence of building) as described above, but may be carried out in such a manner that reception intensities of radio waves from respective base stations 30 according to locations are preliminarily calculated and stored in the deciding unit 14 and the estimation is carried out based on the stored information. Specifically, for example, a service area (area where the mobile communication terminal 20 can perform mobile communication; a calculation object may be each of areas obtained by segmenting the service area into areas) is first segmented into grids in a size of n×m. Here n×m is a preset parameter and is, for example, a size of 150 m×200 m or the like. A center point of each grid is defined as a (predetermined) evaluation point and the reception intensity of the radio wave from each base station 30 at the evaluation point is calculated in the same manner as above. On this occasion, the base stations 30 as calculation objects are all the base stations 30 included in the service area. The base stations 30 as calculation objects may be all base stations 30 within a range of a certain distance (e.g., 1000 m or the like) from the evaluation point.

The information of reception intensities of radio waves for respective base stations 30 at respective evaluation points calculated as described above is stored in (the database or the like of) the positioning server 10. Specifically, an identifier to identify each evaluation point, a location of the evaluation point, and the value of the reception intensity of the radio wave for each base station 30 are stored in association with each other. The deciding unit 14 reads the information of the reception intensities of the radio waves for the respective base stations 30 at the evaluation points included in the determined evaluation circle 43 and estimates the reception intensity according to the location indicated by the location information, in the same manner as above.

The deciding unit 14 makes a comparison between the estimated value of the reception intensity (estimated reception intensity) and the value of the reception intensity of the radio wave (actually measured reception intensity) indicated by the reception information. Specifically, the deciding unit 14 subtracts the measured reception intensity from the estimated reception intensity to obtain a difference, thereby to compare them. Since the estimated reception intensity and the measured reception intensity compared correspond to each other (e.g., the estimated reception intensity and the measured reception intensity both are single values, or the estimated reception intensity and the measured reception intensity both are values for the respective base stations 30), the subtraction is performed between their corresponding values. Therefore, the result of the subtraction is obtained by the same number as the number of estimated reception intensity and measured reception intensity.

Subsequently, the deciding unit 14 estimates the building entry loss, based on the result of the above comparison. Specifically, the deciding unit 14 multiplies the difference between the estimated reception intensity and the measured reception intensity by a coefficient to estimate (an index value indicative of) the building entry loss of the radio wave. The foregoing coefficient is a system parameter preliminarily stored in the deciding unit 14. This value indicative of the building entry loss of the radio wave is one value in the case where the statistical value of reception intensities for all the base stations 30 is taken, or values for the respective base stations 30 in the case using the differences of reception intensities for the respective base stations 30.

The deciding unit 14 determines whether the aforementioned value indicative of the building entry loss of the radio wave is not less than the threshold fed from the criterion setting unit 13, thereby to make the indoor/outdoor decision of the mobile communication terminal 20. The deciding unit 14 notifies the positioning unit 15 of the result of the indoor/outdoor decision.

The positioning unit 15 is a positioning unit that determines a method of positioning for the mobile communication terminal 20 according to the result of the indoor/outdoor decision by the deciding unit 14 and that performs positioning of the mobile communication terminal 20 by the determined method. When the result of the indoor/outdoor decision from the deciding unit 14 is that the mobile communication terminal 20 is located outdoors, the positioning unit 15 executes the GPS positioning on the assumption that the GPS positioning is effective. On the other hand, when the result of the indoor/outdoor decision from the deciding unit 14 is that the mobile communication terminal 20 is located indoors, the positioning unit 15 executes the base station positioning on the assumption that the GPS positioning is ineffective.

The GPS positioning is carried out as described below. The positioning unit 15 receives information of signals received by the mobile communication terminal 20 from the GPS satellites 40, which was transmitted from the mobile communication terminal 20 to the positioning server 10. Subsequently, the positioning unit 15 calculates the locations of the GPS satellites 40, the distances from the mobile communication terminal 20 to the GPS satellites 40, etc. from the information and figures out the location of the mobile communication terminal 20. This calculation may be carried out using assist data indicative of the locations of the GPS satellites 40 and others, acquired from the cellular communication system and transmitted to the positioning server 10 by the mobile communication terminal 20. The positioning unit 15 outputs the information indicative of the location of the mobile communication terminal 20, as information of the positioning result, for example, to the mobile communication terminal 20. The positioning unit 15 executes the base station positioning if it fails to calculate the location of the mobile communication terminal 20 by the GPS positioning.

The base station positioning is carried out as described below. The base station positioning is, specifically, a process as described below. The positioning unit 15 receives the positioning information for base station positioning transmitted from the mobile communication terminal 20 to the positioning server 10. The positioning information for base station positioning is, for example, information indicative of a transmission delay of a radio wave (e.g., RTT: Round Trip Time) transmitted and received between the mobile communication terminal 20 and the base station 30 or indicative of an attenuation of the radio wave (or, possibly, information measured for calculation of those types of information), which is measured and acquired by the mobile communication terminal 20, and information to identify the base station 30 or a sector (base station ID or sector ID). The positioning unit 15 calculates a distance between the mobile communication terminal 20 and the base station 30, based on the foregoing information such as the transmission delay of the radio wave, and figures out the location of the mobile communication terminal 20, with reference to the location information or the like of the base station 30. The positioning server 10 preliminarily stores the information indicative of the location of the base station 30 and the direction of the sector.

The positioning unit 15 outputs the information indicative of the location of the mobile communication terminal 20 calculated, as information of the positioning result, for example, to the mobile communication terminal 20. The positioning process of base station positioning can be performed in a relatively shorter time than the GPS positioning.

Figure 5:
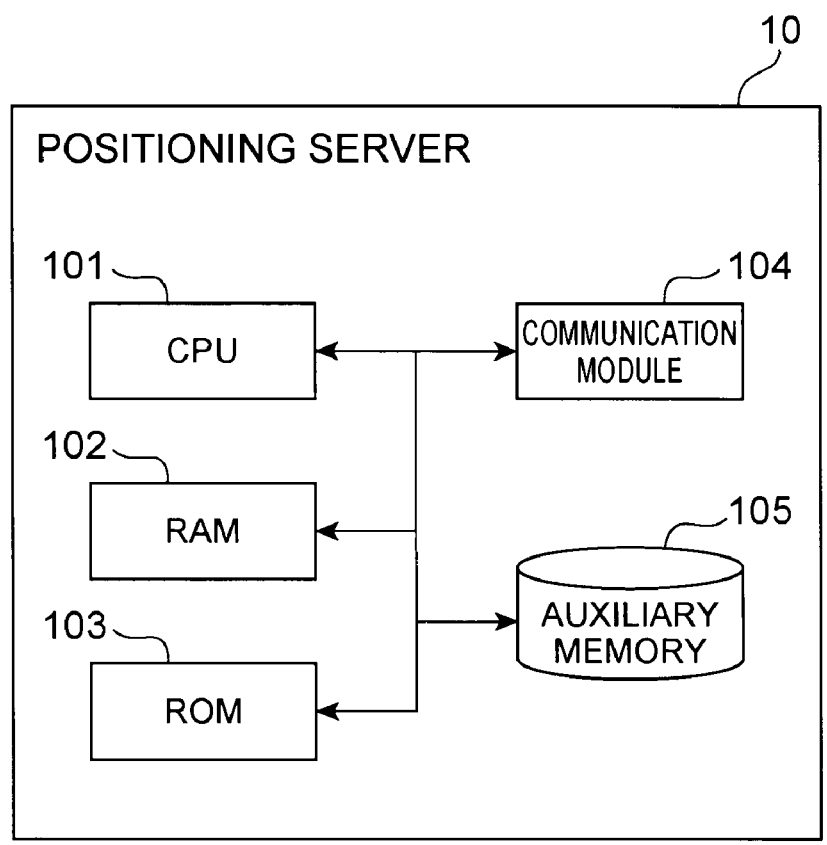
FIG. 5 is a drawing to show a hardware configuration of the positioning server being the indoor/outdoor decision apparatus according to the embodiment of the present invention.

FIG. 5 shows a hardware configuration of the positioning server 10. As shown in FIG. 5, the positioning server 10 is configured as a device including a computer equipped with a CPU 101, RAM (Random Access Memory) 102 and ROM (Read Only Memory) 103 as primary storage devices, a communication module 104 for execution of communication, and an auxiliary storage device 105 such as a hard disk. These constituent elements operate according to a program or the like to exercise the aforementioned functions of the positioning server 10.

Figure 6:
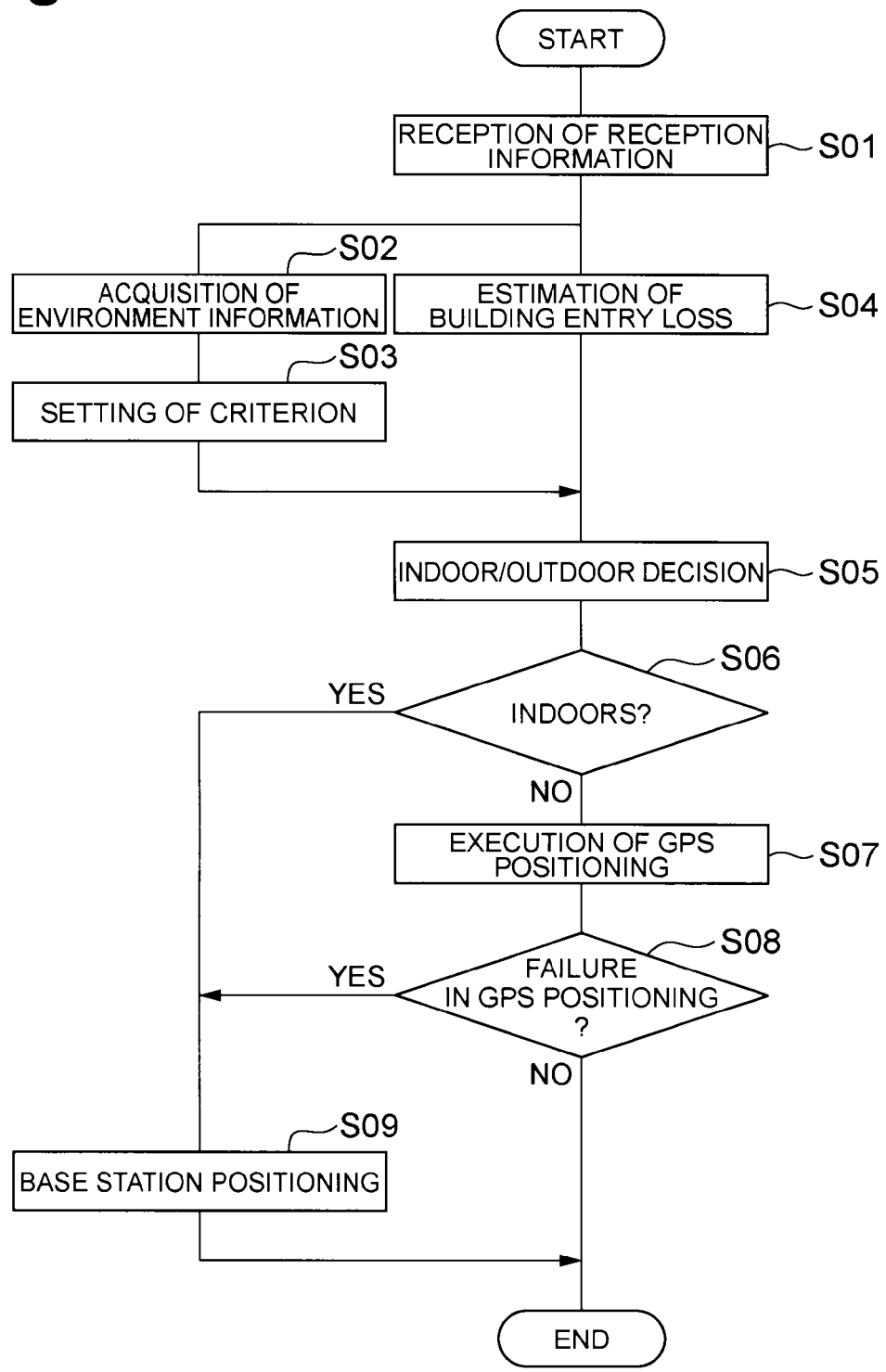
FIG. 6 is a flowchart to show a procedure (indoor/outdoor decision method) executed in the positioning server being the indoor/outdoor decision apparatus according to the embodiment of the present invention.

The following will describe a procedure (indoor/outdoor decision method) executed in the positioning server 10 of the present embodiment, using the flowchart of FIG. 6.

First, the mobile communication terminal 20 receives a radio wave from a base station 30 and transmits the reception information indicative of the reception intensity (signal intensity) of the received radio wave and indicative of the base station 30, as communication information to the positioning server 10. The reception of the radio wave and the transmission of the reception information may be carried out spontaneously from the mobile communication terminal 20 side or may be carried out in accordance with a request from the positioning server 10. In the positioning server 10, the communication information acquiring unit 11 receives the reception information (S01, communication information acquiring step). The reception information is output from the communication information acquiring unit 11 to the deciding unit 14.

Subsequently, the deciding unit 14 estimates the building entry loss, based on the reception information (S04, deciding step). The building entry loss is information for making the indoor/outdoor decision of the mobile communication terminal 20.

On the other hand, in the positioning server 10 the environment information acquiring unit 12 acquires the environment information of the mobile communication terminal 20 (at the time and place where the radio wave associated with the reception information was received) (S02, environment information acquiring step). The environment information may be acquired as received independently of the aforementioned reception information from the mobile communication terminal 20, or information associated with the base station 30 included in the reception information, or information associated with the time of reception may be acquired as the environment information. The acquired environment information is output from the environment information acquiring unit 12 to the criterion setting unit 13.

Next, the criterion setting unit 13 sets a criterion for the indoor/outdoor decision by the deciding unit 14, according to the environment information (S03, criterion setting step). Specifically, the threshold is determined as described above. The information indicative of the set criterion is output from the criterion setting unit 13 to the deciding unit 14.

Next, the deciding unit 14 makes the indoor/outdoor decision of the mobile communication terminal 20, based on the criterion set by the criterion setting unit 13 (S05, deciding step). Specifically, the indoor/outdoor decision is made by comparing the calculated building entry loss with the threshold of the criterion. If the building entry loss is determined to be not less than the threshold, the mobile communication terminal 20 is decided to be located indoors; if the building entry loss is determined to be less than the threshold, the mobile communication terminal 20 is decided to be located outdoors. The information indicative of the decision result by the deciding unit 14 is output from the deciding unit 14 to the positioning unit 15.

When the decision result is that the mobile communication terminal 20 is located outdoors (No in S06), the positioning unit 15 performs the GPS positioning (operation) (S07, positioning step). The information associated with the reception of the positioning signals from the GPS satellites 40 by the mobile communication terminal 20, which is for carrying out the GPS positioning operation, may be acquired based on a request from the positioning server 10 to the mobile communication terminal 20 sent at this point of time, or may be transmitted from the mobile communication terminal 20 before this point of time.

When the positioning unit 15 succeeds in the GPS positioning operation (No in S08), the positioning unit 15 outputs the information indicative of the calculated location of the mobile communication terminal 20 as information of the positioning result, for example, to the mobile communication terminal 20 and the processing is terminated.

When the decision result by the deciding unit 14 is that the mobile communication terminal 20 is located indoors (Yes in S06), the positioning unit 15 performs the base station positioning (operation) of the mobile communication terminal 20 (S09, positioning step) (without execution of the GPS positioning in this case). When the positioning unit 15 fails to perform the GPS positioning operation (Yes in S08), the positioning unit 15 also performs the base station positioning (operation) of the mobile communication terminal 20 (S09, positioning step).

The information associated with transmission and reception of signals to and from the base station 30 by the mobile communication terminal 20, for executing the base station positioning operation, may be acquired based on a request from the positioning server 10 to the mobile communication terminal 20 sent at this point of time, or may be transmitted from the mobile communication terminal 20 before this point of time. If an operation procedure similar to the base station positioning operation has already been performed as calculation of the approximate location on the occasion of the aforementioned indoor/outdoor decision process, the information indicative of the approximate location may be defined as the information of the positioning result and the positioning operation does not always have to be carried out at this point of time.

When the positioning unit 15 succeeds in the base station positioning operation, the positioning unit 15 outputs the information indicative of the calculated location of the mobile communication terminal 20 as the information of the positioning result, for example, to the mobile communication terminal 20 and the positioning procedure is terminated. When the positioning unit 15 fails in the base station positioning operation, it outputs the failure in the positioning procedure as the information of the positioning result, for example, to the mobile communication terminal 20 and the positioning procedure is terminated. The above is the procedure executed in the positioning server 10 of the present embodiment.

In the present embodiment, as described above, the indoor/outdoor decision is made with reference to the communication information and the criterion in execution of the indoor/outdoor decision is set according to the environment associated with the mobile communication terminal 20. Therefore, the indoor/outdoor decision can be made according to the environment from the viewpoint such as the purpose of selection of the positioning method. Specifically, for example, it is feasible to make an indoor decision less likely to be made in the case of the environment to make the error small with the indoor decision (in an actually outdoor case) and to make an outdoor decision less likely to be made in the case of the environment to make the error small with the outdoor decision (in an actually indoor case). Namely, the present embodiment is able to make an appropriate indoor/outdoor decision of the mobile communication terminal 20 according to the purpose of selection of the positioning method or the like.

When the positioning unit for carrying out the positioning is provided as in the positioning server 10 of the present embodiment, the positioning of the mobile communication terminal is carried out by the appropriate positioning method based on the indoor/outdoor decision. In the present embodiment, however, the indoor/outdoor decision is made on the premise that the positioning of the mobile communication terminal 20 is carried out, but the indoor/outdoor decision does not always have to be made as limited only to the case of execution of positioning; it may be carried out independently, or may be carried out on the premise of a process except for the positioning.

In the present embodiment, as described above, the subjective body to perform the processing of the indoor/outdoor decision was the positioning server 10, but the subjective body to carry out the processing may be the mobile communication terminal 20. In that case, specifically, the mobile communication terminal 20 may be configured with all the functions of the present invention. In that case, the information necessary for the procedure of the indoor/outdoor decision or the like is preliminarily transmitted to the mobile communication terminal 20.

In the above-described example, the communication information was information associated with the radio waves transmitted and received between the mobile communication terminal 20 and the base station 30, but the communication information may be information other than that. Namely, the communication information may be any information about wireless communication at the mobile communication terminal 20, and any information other than the information acquired from a radio wave transmitter as long as it can be used for the indoor/outdoor decision of the mobile communication terminal 20. For example, it is possible to use information to specify an RF tag such as an RFID (Radio Frequency IDentification) tag. In that case, the mobile communication terminal 20 has a function to read the information of the RF tag through (short-range) wireless communication, and reads information (e.g., a tag name) to specify the RF tag, from the RF tag. The RF tags are installed at various places in a service area as an object of positioning and the mobile communication terminal 20 can read the information to specify the RF tags, from the RF tags according to the location of the terminal itself. The mobile communication terminal 20 transmits the information to specify the read RF tags and information indicative of the reception intensities of the radio waves received upon reading of the RF tags, as the communication information to the positioning server 10. The communication information acquiring unit 11 receives the communication information transmitted from the mobile communication terminal 20, thereby acquiring the communication information.

In that case, the positioning server 10 preliminarily retains information indicative of whether each RF tag is located indoors or outdoors, in correspondence to the information to specify the RF tag (tag name). This information is preliminarily entered by an administrator or the like of the positioning server 10.

The communication information acquiring unit 11 receives the tag names read from the RF tags by the mobile communication terminal 20, from the mobile communication terminal 20. The communication information acquiring unit 11 outputs the acquired reception information to the deciding unit 14.

Subsequently, the deciding unit 14 determines whether each RF tag the tag name of which was read by the mobile communication terminal 20 is located indoors or outdoors, with reference to the information indicative of whether the aforementioned RF tag is located indoors or outdoors, based on the information received from the mobile communication terminal 20. The deciding unit 14 decides whether the mobile communication terminal 20 is located indoors or outdoors, based on the determination. Specifically, in a case where some of the RF tags whose tag names were read by the mobile communication terminal 20 are located indoors and any one of them is received with the reception intensity not less than a threshold, the mobile communication terminal 20 is decided to be located indoors. The threshold is set in the same manner as the aforementioned method using the table of FIG. 2, by the criterion setting unit 13. The above showed the example of RFID tags, but the indoor/outdoor decision may be made using information read through other short-range wireless communication (e.g., Bluetooth). The decision may also be carried out in the same manner using access points of wireless LAN.

In the above-described example, the indoor/outdoor decision was made by comparing the value based on the communication information, with the threshold, but it may also be carried out by another method. For example, the indoor/outdoor decision may be made by a technique of pattern recognition. The pattern recognition (PM: Pattern Matching or PR: Pattern Recognition) is a process applied to a case where recognition objects can be classified in some concepts (classes), and process to associate an observed pattern with one of those concepts. The observed pattern is called a feature vector (FV). The belonging to each class requires learning with a stochastic correspondence relation between feature vectors and classes from a known learning sample set, as knowledge.

Specifically, the positioning server 10 is configured to preliminarily store plural pieces of communication information of mobile communication terminals 20 located indoors and communication information of mobile communication terminals 20 located outdoors (those pieces of communication information are obtained by measurement or the like in states in which either indoors or outdoors is known) and those pieces of communication information are used as samples for learning of pattern recognition. Specifically, examples of the communication information used in the pattern recognition include the building entry loss, the number of base stations 30 associated with the radio waves received by the mobile communication terminal 20, a mean value of radio wave intensities of the radio waves received by the mobile communication terminal 20, and so on.

Figure 7:
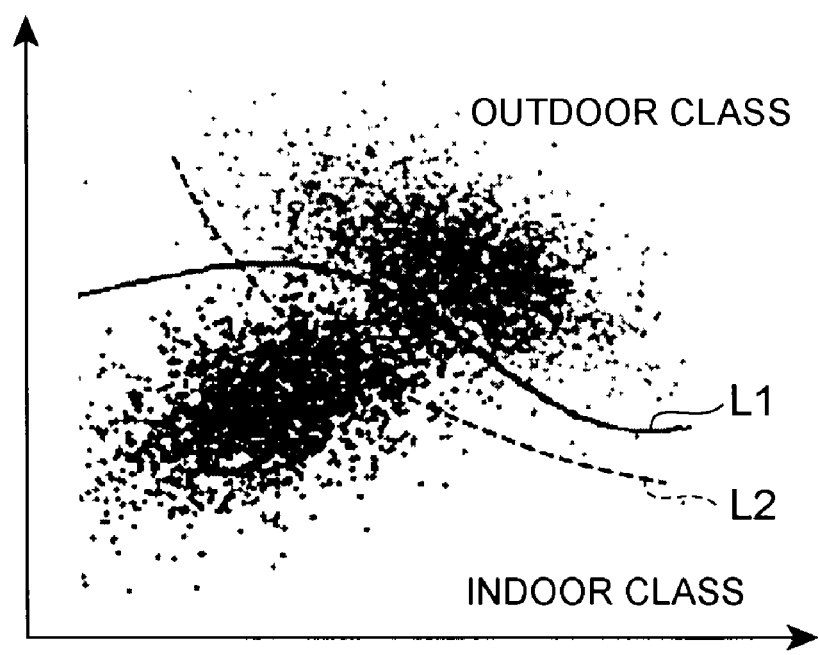
FIG. 7 is a drawing to show a concept of a technique of pattern recognition used in the indoor/outdoor decision.

For example, as shown in FIG. 7, let us assume that there are data of communication information (feature vector) of mobile communication terminals 20 located outdoors and data of communication information (feature vector) of mobile communication terminals 20 located indoors on coordinate axes (in FIG. 7, the indoor data is indicated by thin dots and the outdoor data by thick dots). If a weight on a decision error is assumed to be the same for the outdoor class and the indoor class, a curve indicated by solid line L1 in FIG. 7 is knowledge by learning and an error of classification becomes minimum by this curve.

The criterion setting unit 13 sets the weight for the classification into the indoor class and the outdoor class by pattern recognition, as the criterion for the indoor/outdoor decision. The setting of the weight can be performed, for example, in the same manner as the aforementioned method using the table of FIG. 2. The deciding unit 14 classifies the preliminarily-stored communication information of mobile communication terminals 20 located indoors and communication information of mobile communication terminals 20 located outdoors into the class of the communication information of mobile communication terminals located indoors and the class of the communication information of mobile communication terminals located outdoors, by the technique of pattern recognition, based on the aforementioned weight set, and decides to which class the communication information acquired by the communication information acquiring unit 11 belongs. The deciding unit 14 can make the indoor/outdoor decision by comparing the communication information of a decision object with the curve calculated by the classification to decide to which class the communication information belongs. For example, if a weight on one decision error (for example, the outdoor class) is made larger, the error of the class decision becomes larger with the solid line L1. In that case, the classification is performed with a dashed line L2, whereby the error of the class decision becomes minimum. The dashed line L2 is knowledge by learning in the case where the weight of the outdoor class is made larger.

The aforementioned embodiment does not use the positioning result of other mobile communication terminals 20 for the setting of the criterion by the criterion setting unit 13, but it is also possible to use the positioning result of other mobile communication terminals 20 as described below. The criterion setting unit 13 stores the result of the positioning for the mobile communication terminal 20 obtained by the aforementioned procedure shown by the flowchart of FIG. 6, in association with the environment information associated with the mobile communication terminal 20 acquired by the environment information acquiring unit. The positioning result is stored, for example, as the result of the indoor/outdoor decision (different from the decision by the deciding unit 14). When the GPS positioning is successfully done, the information stored is that the mobile communication terminal 20 is highly likely to be located outdoors (regardless of the result of the decision by the deciding unit 14). If the GPS positioning results in a failure, the information stored is that the mobile communication terminal 20 is highly likely to be located indoors (regardless of the result of the decision by the deciding unit 14). The information used as the environment information stored in association with the positioning result herein is information indicative of base stations 30 or sectors where the mobile communication terminal 20 is located, information indicative of reception intensities of radio waves received from the respective base stations 30 by the mobile communication terminal 20, and so on.

The criterion setting unit 13 compares the environment information (i.e., the information of the located base stations 30 or sectors and the information of the reception intensities) acquired by the environment information acquiring unit 12, with the environment information preliminarily stored in association with the positioning results. The criterion setting unit 13 determines a criterion with reference to the positioning result associated with environment information approximate to (or coincident with) the environment information acquired by the environment information acquiring unit 12. For example, if more than half of positioning results associated with the environment information with close reception intensities (e.g., a correlation factor thereof is not less than a prescribed value) among the data of the mobile communication terminals 20 located in the same base station 30 and in the same sector, show the high possibility of indoor location (i.e., failure in the GPS positioning), the threshold for the building entry loss is decreased (i.e., it is made easier to make an indoor decision).

The configuration as described above permits the criterion to be determined so as to reflect the results of positioning for other mobile communication terminals 20, and enables the apparatus to make a more appropriate indoor/outdoor decision of the mobile communication terminal 20 in terms of selection of the positioning method.

What is claimed is:

1. An indoor/outdoor decision apparatus for making an indoor/outdoor decision on whether a mobile communication terminal is located indoors or outdoors, comprising:

a communication information acquiring unit which acquires communication information about wireless communication at the mobile communication terminal, the communication information including at least a value associated with a reception intensity of a radio wave received by the mobile communication terminal from at least one radio wave transmitter;

an environment information acquiring unit which acquires environment information indicative of an environment associated with the mobile communication terminal from the mobile communication terminal, the environment information including at least time information, weather information, and region information associated with the mobile communication terminal;

a criterion setting unit which sets a threshold as a criterion for the indoor/outdoor decision, according to the environment information acquired by the environment information acquiring unit; and a deciding unit which makes the indoor/outdoor decision by comparing the value associated with the reception intensity acquired by the communication information acquiring unit, with the threshold set by the criterion setting unit.

2. The indoor/outdoor decision apparatus according to claim 1,
wherein the deciding unit uses a technique of pattern recognition to classify preliminarily-stored communication information of mobile communication terminals located indoors and communication information of mobile communication terminals located outdoors into a class of communication information of mobile communication terminals located indoors and a class of communication information of mobile communication terminals located outdoors, and decides to which class the communication information acquired by the communication information acquiring unit belongs, thereby making the indoor/outdoor decision, and
wherein the criterion setting unit sets a weight to be used in the classification, as a criterion for making the indoor/outdoor decision.

3. The indoor/outdoor decision apparatus according to claim 1, further comprising positioning unit which determines a method of positioning for the mobile communication terminal in accordance with a result of the indoor/outdoor decision made by the deciding unit, and which performs positioning of the mobile communication terminal by the determined method.

4. The indoor/outdoor decision apparatus according to claim 3, wherein the criterion setting unit preliminarily stores results of positioning for other mobile communication terminals by the positioning unit and environment information associated with the other mobile communication terminals acquired by the environment information acquiring unit, in association with each other, and sets a criterion for making the indoor/outdoor decision on the basis of said pieces of information.

5. An indoor/outdoor decision method for making an indoor/outdoor decision on whether a mobile communication terminal is located indoors or outdoors, comprising:
a communication information acquiring step of acquiring communication information about wireless communication at the mobile communication terminal, the communication information including at least a value associated with a reception intensity of a radio wave received by the mobile communication terminal from at least one radio wave transmitter;
an environment information acquiring step of acquiring environment information indicative of an environment associated with the mobile communication terminal from the mobile communication terminal, the environment information including at least time information, weather information, and region information associated with the mobile communication terminal;
a criterion setting step of setting a threshold as a criterion for the indoor/outdoor decision, according to the environment information acquired in the environment information acquiring step; and
a deciding step of making the indoor/outdoor decision by comparing the value associated with the reception intensity acquired by the communication information acquiring unit, with the threshold set by the criterion setting unit.

6. The indoor/outdoor decision apparatus according to claim 1, wherein the threshold is set to a first value when the environment information indicates that the mobile communication terminal is indoors and the threshold is set to a second value that is higher than the first value when the environment information indicates that the mobile communication terminal is outdoors.

* * * * *